(12) United States Patent
Kobayashi et al.

(10) Patent No.: US 11,616,354 B2
(45) Date of Patent: Mar. 28, 2023

(54) BATTERY PACK

(71) Applicant: Envision AESC Energy Devices Ltd., Sagamihara (JP)

(72) Inventors: Yoshiki Kobayashi, Kanagawa (JP); Toru Suzuki, Kanagawa (JP)

(73) Assignee: ENVISION AESC JAPAN LTD., Kanagawa (JP)

( * ) Notice: Subject to any disclaimer, the term of this patent is extended or adjusted under 35 U.S.C. 154(b) by 440 days.

(21) Appl. No.: 16/624,095

(22) PCT Filed: Mar. 20, 2018

(86) PCT No.: PCT/JP2018/011103
§ 371 (c)(1),
(2) Date: Dec. 18, 2019

(87) PCT Pub. No.: WO2018/235367
PCT Pub. Date: Dec. 27, 2018

(65) Prior Publication Data
US 2020/0153222 A1    May 14, 2020

(30) Foreign Application Priority Data
Jun. 21, 2017  (JP) .............................. JP2017-121728

(51) Int. Cl.
*H04M 1/00*       (2006.01)
*H02G 11/00*      (2006.01)
(Continued)

(52) U.S. Cl.
CPC .......... *H02G 11/00* (2013.01); *H01M 50/183* (2021.01); *H01M 50/20* (2021.01)

(58) Field of Classification Search
CPC ....... H02G 11/00; H02G 3/00; H01M 50/183; H01M 50/20; H01M 50/24; H01M 50/172; H01M 50/543
See application file for complete search history.

(56) References Cited

U.S. PATENT DOCUMENTS 6,459,040 B2 * 10/2002 Teunisse ............ H01R 13/6596
174/382
8,693,190 B2 *  4/2014 Chang ................... G06F 1/1679
361/679.55
(Continued)

FOREIGN PATENT DOCUMENTS

CN       204361146 U    5/2015
JP       H08-335420 A  12/1996
(Continued)

OTHER PUBLICATIONS

International Search Report dated Sep. 13, 2016 in PCT/JP2016/069975 with English-language translation (4 pgs.).

*Primary Examiner* — Nhan T Le
(74) *Attorney, Agent, or Firm* — Foley & Lardner LLP

(57) ABSTRACT

A battery pack houses a battery inside a battery case, the battery case (100) includes an opening (450), cables (200, 300) electrically connected with the battery is inserted to the opening, a cable protection member (400) including a through portion (410) is arranged at the opening, the cable protection member is attachable to the opening in at least two different directions, and a position of the through portion to the battery case changes according to an attaching direction.

9 Claims, 20 Drawing Sheets

(51) Int. Cl.
*H01M 50/20* (2021.01)
*H01M 50/183* (2021.01)

(56) References Cited

U.S. PATENT DOCUMENTS 10,693,180 B2 * 6/2020 Li .................. H01M 50/298
2014/0087230 A1 * 3/2014 Schaefer ............ H01M 50/20
429/96

FOREIGN PATENT DOCUMENTS

| JP | H09-009461 A | 1/1997 |
| JP | 2001-160329 A | 6/2001 |
| JP | 2007-317579 A | 12/2007 |
| JP | 2015-127993 A | 7/2015 |
| JP | 2015-225806 A | 12/2015 |

\* cited by examiner

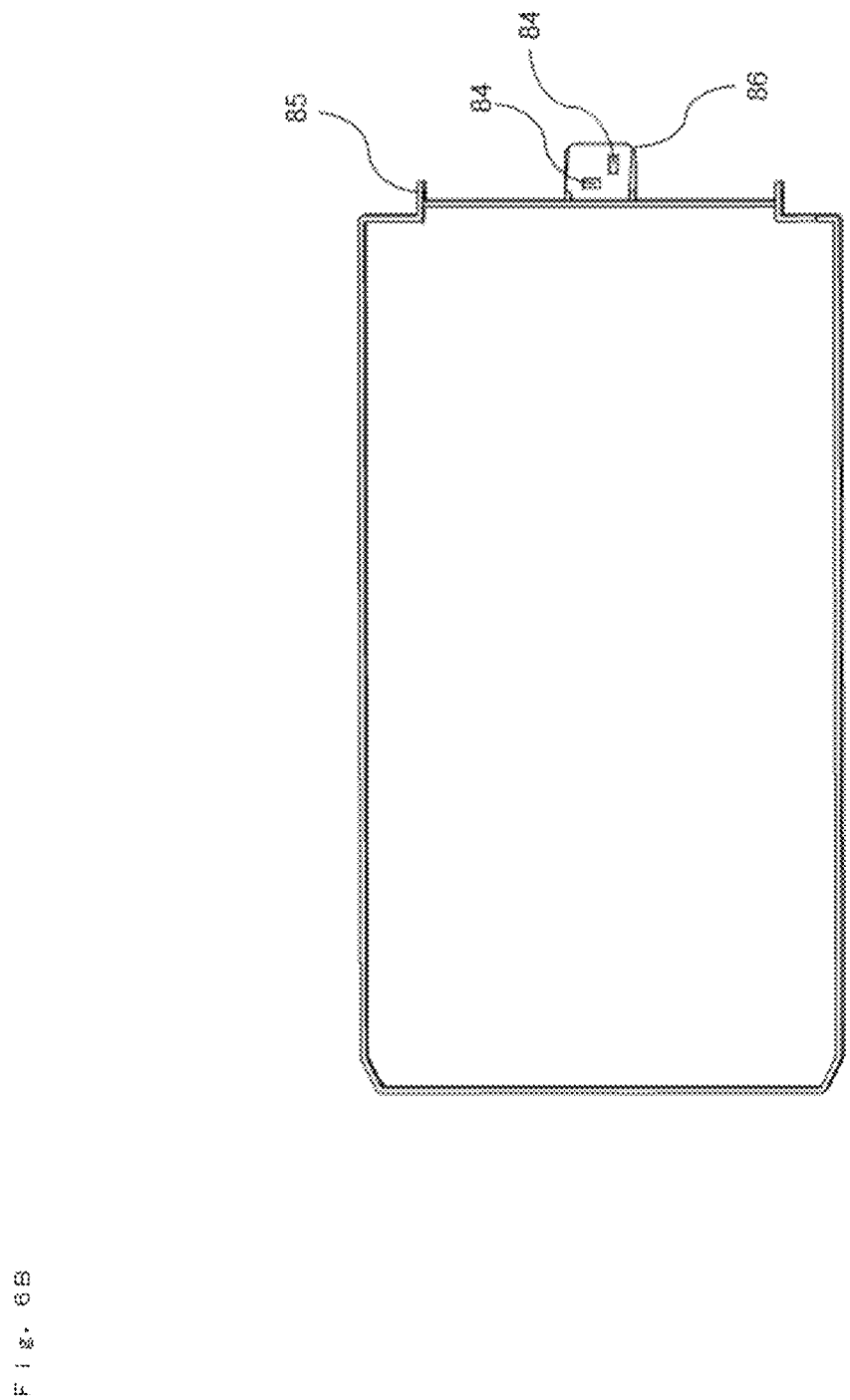
FIG. 5.29

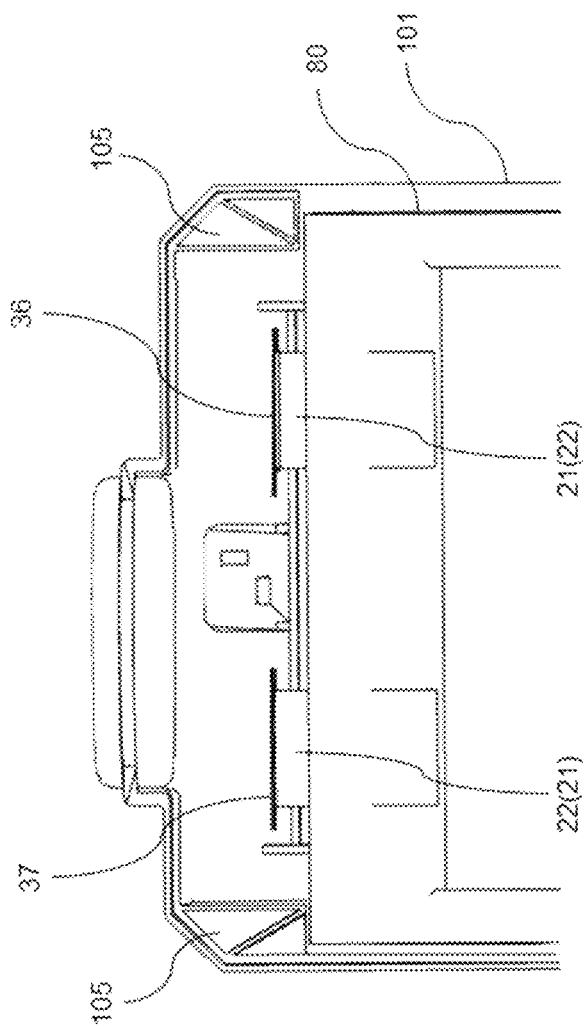

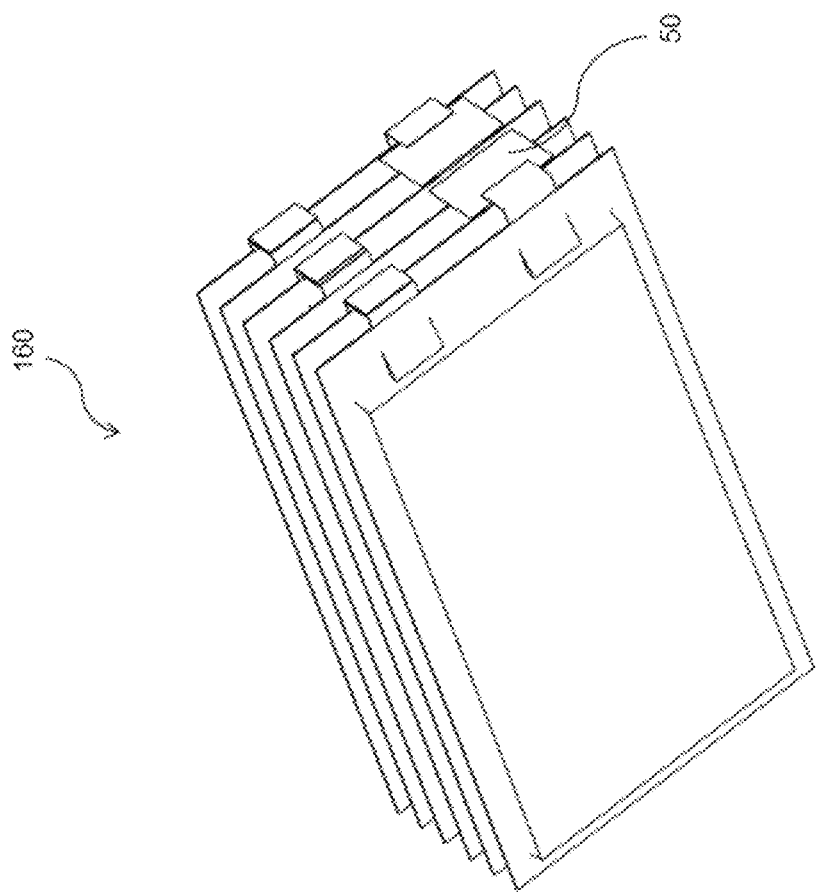

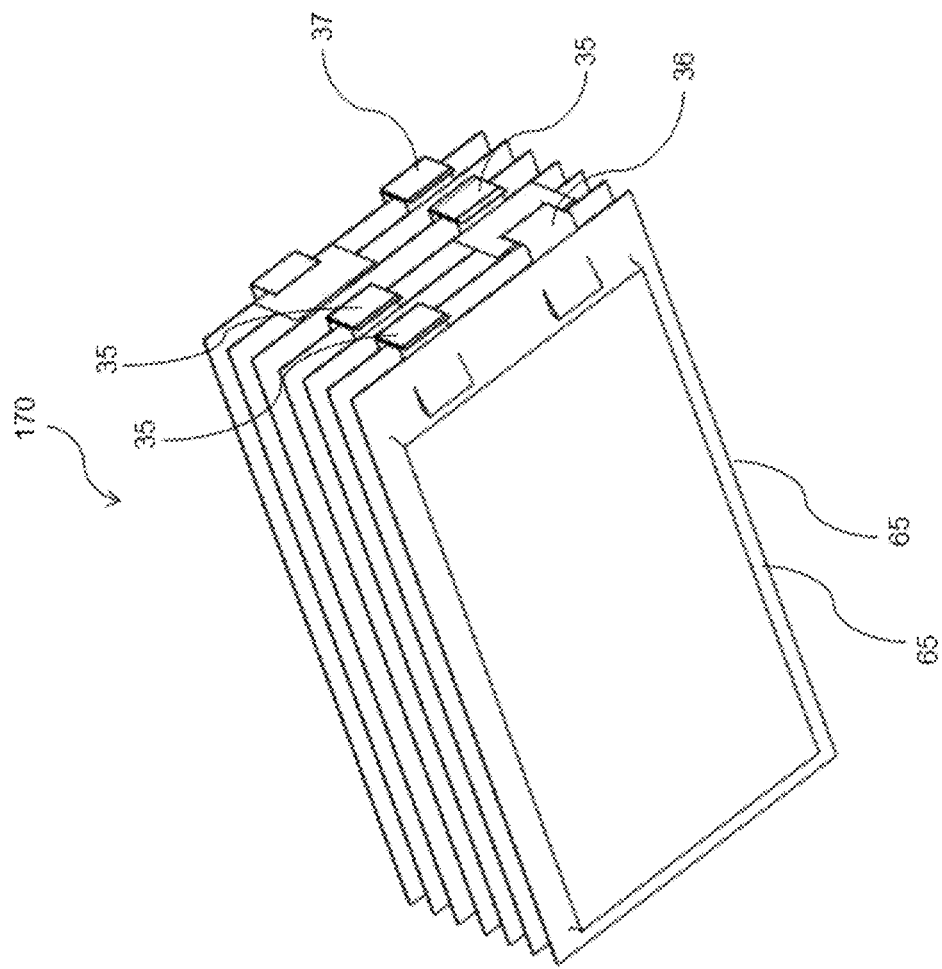

BATTERY PACK

CROSS-REFERENCE TO RELATED APPLICATIONS

This application is a national stage entry of International Appl. No. PCT/JP2018/011103, filed Mar. 20, 2018, which claims priority to Japanese Appl. No. 2017-121728, filed Jun. 21, 2017; the disclosures of both of which are incorporated by reference herein in their entirety.

TECHNICAL FIELD

The present invention relates to a battery pack.

BACKGROUND ART

For a battery, a positive electrode and a negative electrode are arranged facing each other with a separator interposed therebetween and housed in an outer container together with an electrolytic solution. A positive electrode active material is formed at a part of positive collector foil for the positive electrode, and a negative electrode active material is formed at a part of negative collector foil for the negative electrode. There are several kinds of outer containers. An outer container molded from a thin flexible sheet like aluminum has an advantage of being light in weight. On the other hand, such an outer container has a disadvantage of being easily deformed when force is directly applied to the outer container.

When a battery is used as a drive power source for moving a vehicle or the like, a lot of vibrations and impacts are applied to the battery. When the battery is used in an aircraft such as an unmanned helicopter, not only measures against the vibrations and the impacts but also measures for preventing disconnection and short-circuits of wiring are very important in order to prevent the battery from falling on the ground. For the battery in which the flexible sheet is the outer container, in particular, it is possible that a connection portion of the positive collector foil and a positive electrode terminal and a connection portion of the negative collector foil and a negative electrode terminal are affected by the impacts.

The connection portions are portions connected with one end of the positive electrode terminal and the negative electrode terminal (sometimes referred to as electrode terminals altogether, hereinafter) and are positioned inside the outer container. In addition, the other end of the electrode terminals is pulled out to outside of the outer container. When force enough to deform the container is applied to the electrode terminals, the force is also transmitted to the connection portions of the collector foil and the electrode terminals, and there are a risk that the electrode terminals and the collector foil are disconnected and a risk that the collector foil is cut. The battery using the flexible sheet for the outer container is often used as a battery pack in which the battery is housed inside a different battery case further for protection from the impacts and the vibrations (for example, Patent Literature 1).

For the battery housed inside the battery case or an assembled battery in which a plurality of batteries are connected, there are cases when a cable is connected to the electrode terminals so as to be electrically connected with the outside of the battery case. Then, the connection portion of the electrode terminals and the cable also has the risk of the disconnection when the cable is pulled or the like.

LITERATURE OF THE PRIOR ART

Patent Documents

Patent Document 1: JP2007-317579A

SUMMARY OF THE INVENTION

Problem to be Solved by the Invention

As energy of a secondary battery is increased, a wire diameter of a cable attached to an electrode terminal also increases. When the cable is bent at large curvature and arranged, force to return to an original form of the cable increases. Also when the cable bent at a large curvature is connected during manufacture, a possibility of disconnection of the cable increases by continuously receiving impacts and vibrations. In addition, when the cable is arranged inside the battery case at small curvature or the cable is arranged inside the battery case without being bent, following problems arise. First, the problem is that space to arrange the cable inside the battery case becomes big. Next, the problem is that a position to take out the cable needs to be changed according to the position of the electrode terminal.

In Patent Literature 1, a laminated body of a positive electrode and a negative electrode can be protected from external impacts by using case 4. However, by a technology disclosed in Patent Literature 1, protection for the connection portion of the collector foil and the electrode terminal is not sufficient. In addition, the technology disclosed in Patent Literature 1 does not take cable wiring into consideration.

It is an object of the present invention, in consideration of the problems described above, to provide a battery pack that attains objectives of increasing a degree of freedom of cable wiring and suppressing a possibility of disconnection.

Means for Solving the Problem

A battery pack of the present invention is the battery pack that houses a battery inside a battery case, and includes an opening for inserting one or more cables that electrically connects inside and outside of an outside container, a cable protection member including a through portion is arranged at the opening, the cable protection member is attachable to the opening in at least two different directions, and a position of the through portion to the battery case changes according to an attaching direction.

Effect of the Invention

According to the present invention, since a cable take-out position can be changed, it is possible to provide a battery pack that increases a degree of freedom of cable wiring and suppresses a possibility of disconnection.

BRIEF DESCRIPTION OF DRAWINGS

FIG. 5A is a schematically diagram illustrating an example of a cable protection member provided in the battery pack of the first and second example embodiments.

FIG. 5B is a schematically diagram illustrating an example of the cable protection member provided in the battery pack of the first and second example embodiments.

FIG. 5C is a schematically diagram illustrating an example of the cable protection member provided in the battery pack of the first and example second embodiments.

FIG. 9 is a schematically diagram viewing a positional relation of the battery case, the battery protector and a cell transparently from the electrode lamination direction.

FIG. 10 is a perspective view schematically illustrating an example of an assembled battery used in the battery pack of the first example embodiment.

FIG. 11 is a perspective view schematically illustrating an example of the assembled battery used in the battery pack of the second example embodiment.

FIG. 12 is a perspective view schematically illustrating an example of a unit battery in which a flexible sheet is an outer container.

FIG. 13 is a perspective view schematically illustrating an example of a positive electrode and a negative electrode inside the unit battery.

FIG. 14 is a perspective view schematically illustrating an example of an assembled battery in which the battery protector is added to the assembled battery (FIG. 10) configuring the battery pack of the first example embodiment.

BEST MODE FOR CARRYING OUT THE INVENTION

First Example Embodiment

Figure 1:
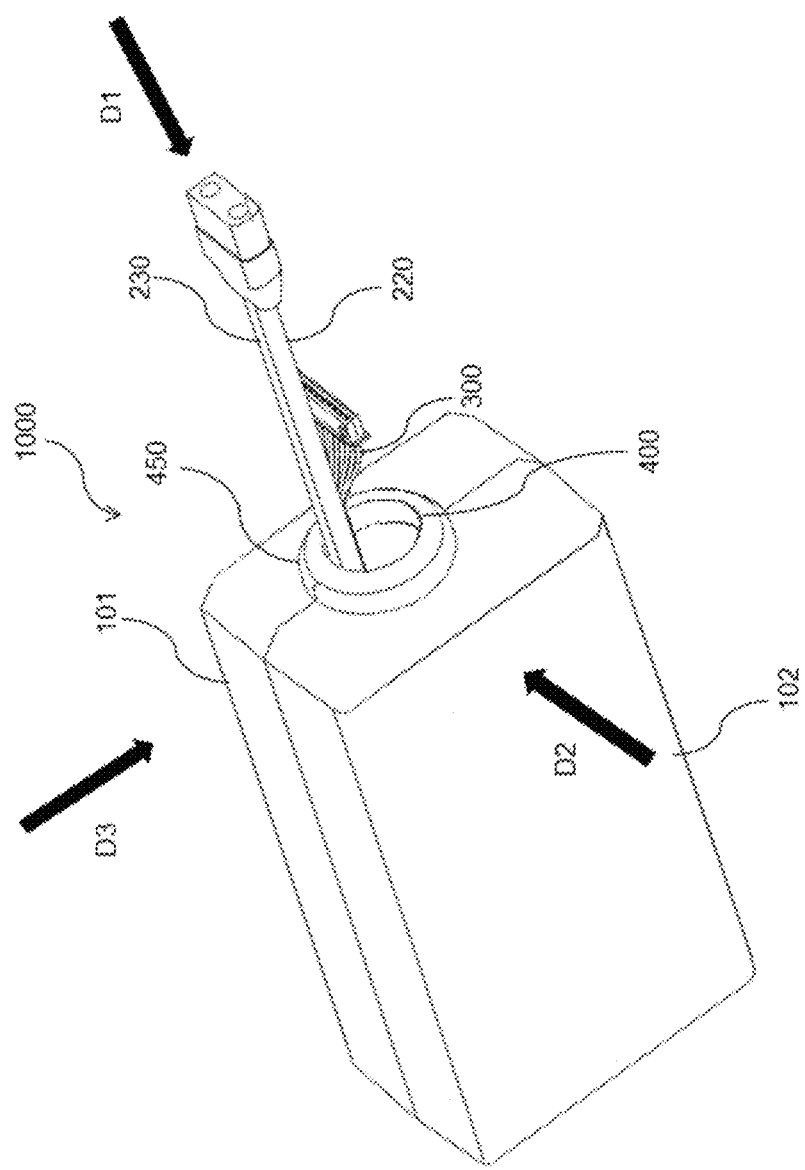
FIG. 1 is a perspective view illustrating an example of a battery pack of a first example embodiment.

FIG. 1 is a perspective view illustrating an example of a battery pack of the first example embodiment. Battery pack 1000 of the first embodiment includes an assembled battery in which a plurality of unit batteries 1 (FIG. 2) with a flexible film as an outer container are laminated inside battery case 100. Battery case 100 can be formed by joining first case body 101 and second case body 102. Battery case 100 includes opening 450. Opening 450 includes cable protection member 400. Cable protection member 400 includes through portion 410 (FIG. 5). Through through portion 410, power line 200 and sense line 300 are pulled out from the inside of battery case 100 to the outside. Power line 200 includes two lines of cable 220 and cable 230 of different polarities. Sense line 300 is a signal line capable of outputting states such as a voltage, a current and a temperature of the battery.

FIG. 13 is a perspective view schematically illustrating an example of a positive electrode and a negative electrode inside the unit battery. As illustrated in FIG. 13, electrode terminals 21 and 22 to be the positive electrode and the negative electrode are provided inside unit battery 1.

The assembled battery is housed inside battery case 100. The assembled battery housed in battery case 100 in FIG. 1 is, for example, assembled battery 160 in which an even number of unit batteries 1 are connected in series as illustrated in FIG. 10. Assembled battery 160 illustrated in FIG. 10 illustrates an example of connecting six pieces of unit batteries 1 in series. To a part where the electrode terminals are connected in series, sense line 300 for measuring the voltage, the current or the like can be connected. In order to be connected with sense line 300, joint terminal 35 can be connected to an end portion of the electrode terminals, or the part where the electrode terminals are connected. Similarly, the joint terminal can be also connected to a part connected with power line 200. FIG. 14 is a schematically diagram in which battery protector 80 (FIG. 6) to be described later is arranged at a position to be a center in a lamination direction of the assembled battery. FIG. 14 illustrates (similarly to FIG. 10), an example of connecting six pieces of unit batteries 1 in series. In FIG. 14, in the laminated assembled battery, between a third layer and a fourth layer counting from unit battery 1 of an outermost layer on one side, battery protector 80 is arranged.

Figure 6A:
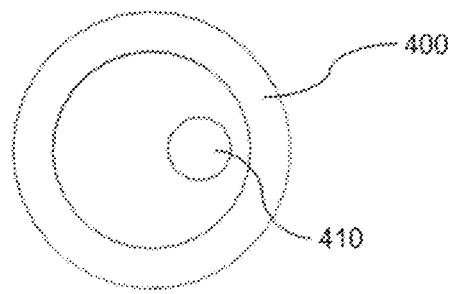
FIG. 6A is a perspective view schematically illustrating an example of a battery protector provided in the battery pack of the first and second example embodiments.
Figure 6B:
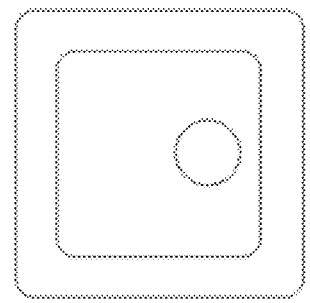
FIG. 6B is a plan view schematically illustrating an example of the battery protector provided in the battery pack of the first and second example embodiments.
Figure 6C:
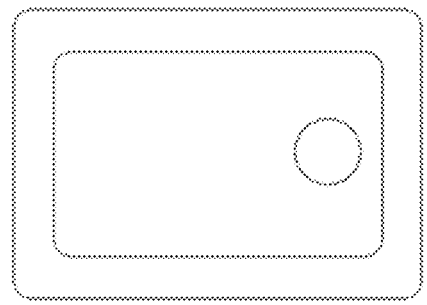
FIG. 6C is a side view (X-X' sectional view of FIG. 6A) schematically illustrating an example of the battery protector provided in the battery pack of the first and second example embodiments.
Figure 6A:
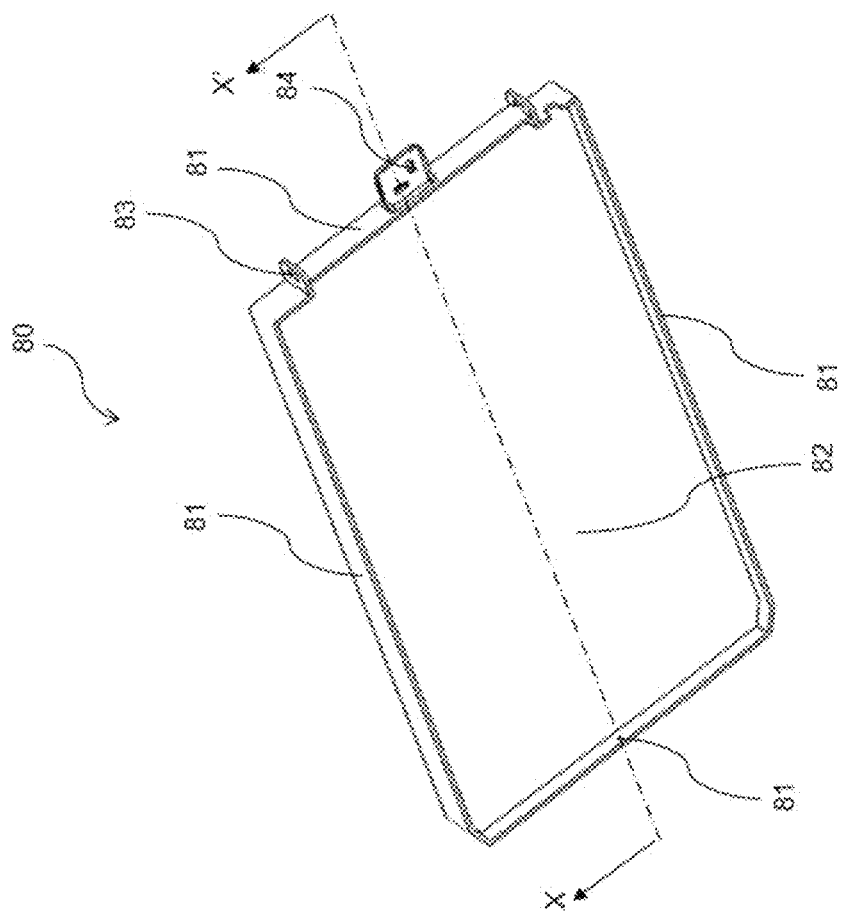

Here, battery protector 80 is a member in which plate portion 82 to face the battery is formed in an area surrounded by frame portion 81, as illustrated from FIG. 6A to FIG. 6C. Battery protector 80 can increase strength of the battery including flexible outer container 60 (FIG. 11). On an outer side face of frame portion 81, through holes 83 and 84 are provided. Through holes 83 and 84 are sufficient when fixing member 90 (FIG. 7A) for fixing cables 220 and 230 can be inserted. For through holes 83 and 84, the through holes may be directly provided on an outer surface of frame portion 81. However, from a viewpoint of productivity, it is preferable to form through holes 83 and 84 at a projection portion projected from a frame body. Note that it is not necessary to form plate portion 82 facing the battery in the area surrounded by the frame of battery protector 80. The area surrounded by the frame of battery protector 80 may be space.

Battery protector 80 includes a same shape as an outline of unit battery 1, or an outer shape larger than an outer edge of unit battery 1. FIG. 9 is a see-through diagram schematically illustrating arrangement of first case body 101, battery protector 80 and unit battery 1. Abutting portion 105 is provided on an inner side face of first case body 101. Abutting portion 105 is provided on a position at a shortest distance from battery protector 80. In other words, abutting portion 105 is arranged on the inner side face of battery case 100 facing electrode terminals 21 and 22 of unit battery 1, at the position which is at the shortest straight distance from unit battery 1 and does not face electrode terminals 21 and 22. Thus, even when a large impact is applied to battery pack 1000, abutting portion 105 is brought into contact with battery protector 80 first. Therefore, unit battery 1 is prevented from receiving the large impact from first case body 101 and second case body 102 (battery case 100).

On a peripheral edge of flexible outer container 60 of unit battery 1, flange portion 65 (FIG. 11, FIG. 12) where the flexible film is stuck together by heat welding is provided. At a part of flange portion 65, electrode terminals 21 and 22, one end of which is connected with an electrode of unit battery 1 and the other end of which is pulled out to the outside of outer container 60, are arranged. For electrode terminals 21 and 22, terminals are folded and welded such that unit batteries 1 adjacent in a lamination direction are connected with each other in series. When an even number of unit batteries 1 in a shape illustrated in FIG. 12 are connected in series in order in the lamination direction, the terminals of the different polarities positioned in an outermost layer are arranged so as to overlap in a plan view from the lamination direction. It is preferable to fold back the terminals in the outermost layer to an inner side of the lamination direction of the assembled battery to suppress a lamination height. In addition, insulation sheet 50 is arranged between the terminals so that the terminals of the assembled battery are not brought into contact with each other.

Figure 2:
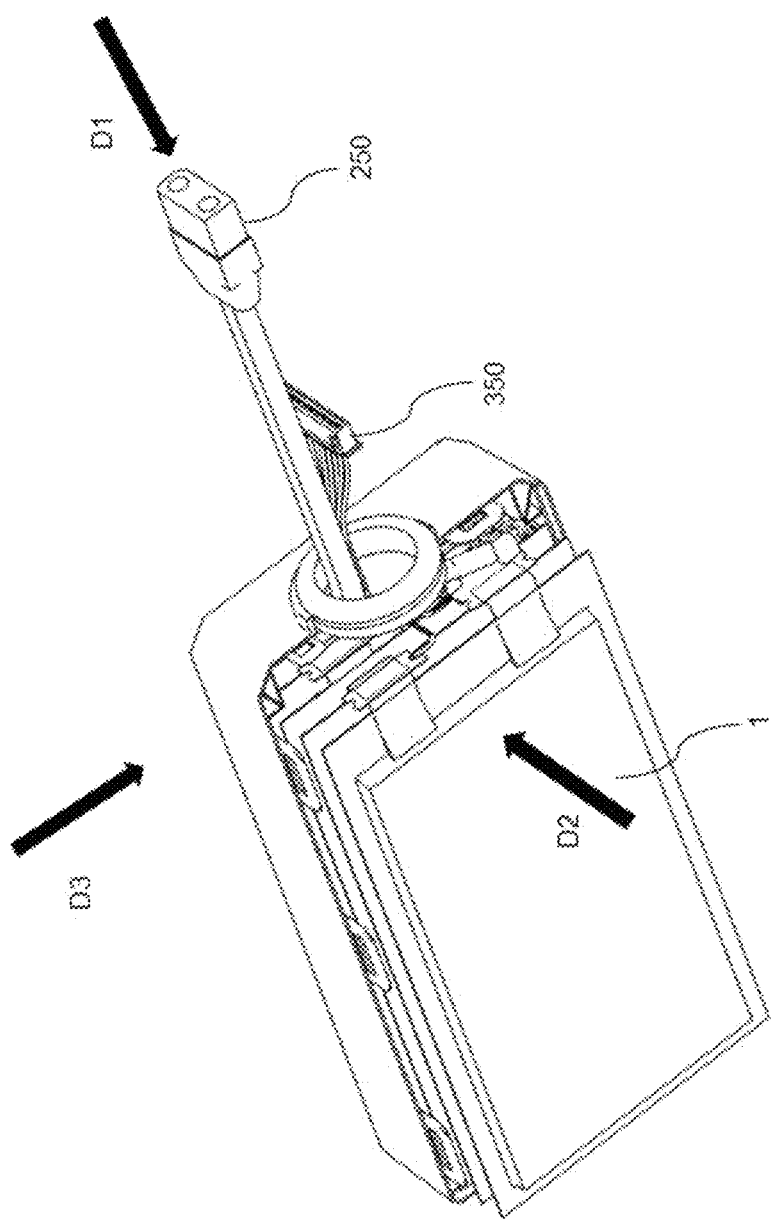
FIG. 2 is a perspective view schematically illustrating inside of a battery case in an example of the battery pack illustrated in FIG. 1.
Figure 7A:
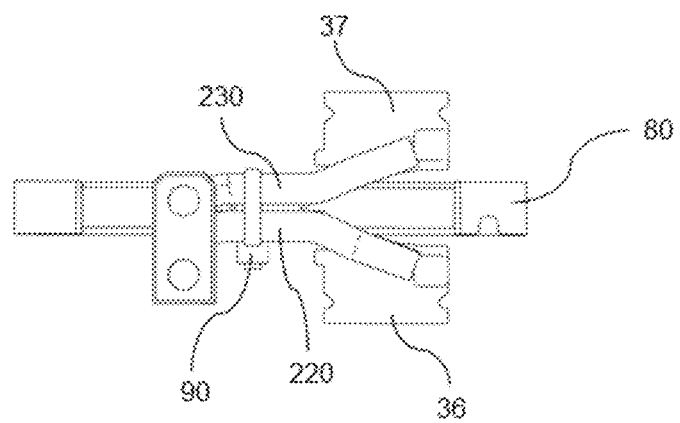
FIG. 7A is a schematically diagram viewing arrangement of a cable and the battery protector in the battery pack of the first example embodiment transparently from an end face where the cable protection member is arranged (viewing from a direction of an arrow D1 in FIG. 1 and FIG. 2).

FIG. 7A is a schematically diagram viewing the arrangement of cables 220 and 230 and battery protector 80 in battery pack 1000 illustrated in FIG. 1 and FIG. 2 from a direction vertical to an end face where cable protection member 400 is arranged (the direction of an arrow D1 in FIG. 1 and FIG. 2). In FIG. 7A, in order to facilitate understanding of the arrangement of power line 200, description of sense line 300 is omitted in illustration. Joint terminals 36 and 37 connected to electrode terminals 21 and 22 of assembled battery 160 (FIG. 10) and cables 220 and 230 that are power line 200 are welded respectively. One end side of power line 200 is attached toward a transverse center direction of battery protector 80. Cables 220 and 230 on the other end side of power line 200 are fixed to through hole 84 of locking portion 86 provided on a transverse frame portion center of battery protector 80 using fixing member 90. FIG. 6B illustrates a case where two through holes 84 are formed at locking portion 86, however, this is not the only case. Cables 220 and 230 do not need to be inserted to all the through holes and may be fixed to the through holes at one or more parts in an easy-to-use direction. It is preferable that fixing member 90 is an insulating member. Cables 220 and 230 are fixed while compressing an insulating coating that coats the cables 220 and 230 by fixing member 90 or while making fixing member 90 bite into the insulation coating. Thus, it is possible to prevent force applied from a side fixed by fixing member 90 of cables 220 and 230 to detach a connection portion of the side not fixed by fixing member 90 of cables 220 and 230 and joint terminals 36 and 37. In addition, it is possible to prevent application of the force to disconnect collector foil and the electrode terminals inside unit battery 1 indirectly connected to cables 220 and 230.

Note that, other than providing locking portions 85 and 86 in battery protector 80, the locking portion may be provided on an inner wall of battery case 100 and cables 220 and 230 may be fixed using the locking portion provided on the inner wall of battery case 100 and the fixing member.

Cables 220 and 230 can be bent at large curvature on the other end side from the part locked by locking portion 86. In addition, pull-out can be performed in a short distance to the outside of battery case 100 from the end face where electrode terminals 21 and 22 of assembled battery 160 are arranged. Cables 220 and 230 are pulled out to the outside of battery case 100 via through portion 410 (FIG. 5) provided in cable protection member 400. To the other end of cables 220 and 230, connector 250 is connected (to the other end of sense line 300, connector 350). Therefore, it is preferable to insert cables 220 and 230 to through portion 410 of cable protection member 400 in advance before fixing one end of cables 220 and 230 to joint terminals 36 and 37. From the viewpoint of waterproofness, through portion 410 according to a sectional shape of cables 220 and 230 and sense line 300 may be formed. In addition, a resin or the like may be filled at a contact part of through portion 410 and cables 220 and 230 and sense line 300. Further, it is further preferable to apply the both.

Note that through portion 410 has an opening area equal to or smaller than a total cross-sectional area of cables 220 and 230 and sense line 300 inserted to through portion 410, and the through portion 410 and cables 220 and 230 and sense line 300 may be closely attached without a gap.

Further, through portion 410 and cables 220 and 230 and sense line 300 inserted to through portion 410 may be tightly sealed through a sealing member.

Figure 7B:
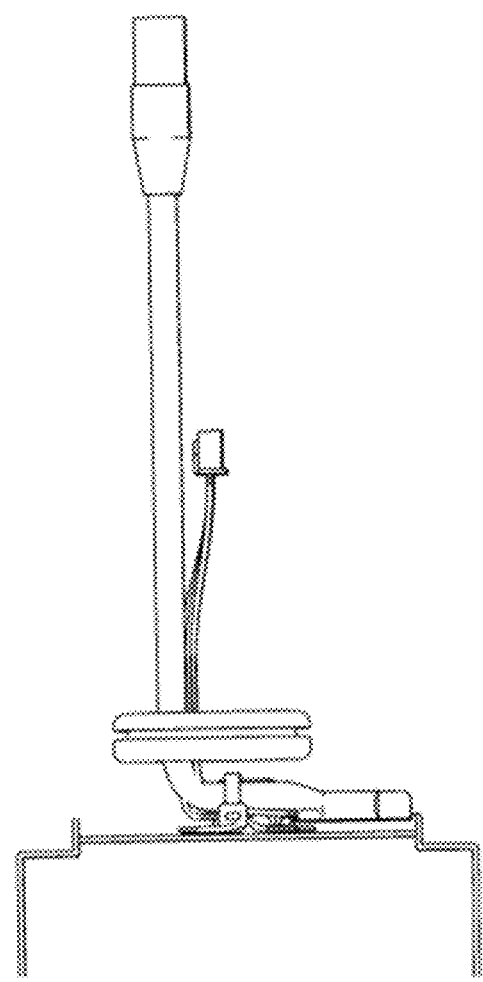
FIG. 7B is a schematically diagram viewing the arrangement of the cable, the battery protector and the cable protection member in the battery pack of the first example embodiment transparently from an electrode lamination direction (viewing from the direction of an arrow D2 in FIG. 1 and FIG. 2).
Figure 7C:
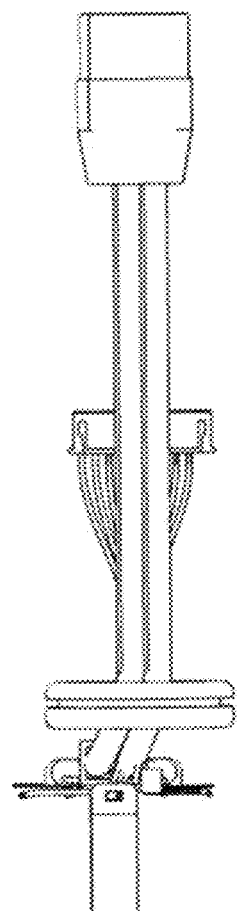
FIG. 7C is a schematically diagram viewing the arrangement of the cable, the battery protector and the cable protection member in the battery pack of the first example embodiment transparently from a side face vertical to the electrode lamination direction and also vertical to the end face where the cable protection member is arranged (viewing from the direction of an arrow D3 in FIG. 1 and FIG. 2).

As illustrated in FIG. 7A and FIG. 7B, in the example embodiment, both cables of power line 200 and sense line 300 are pulled out from the part closer to an end portion direction than the center of battery case 100. Then, as illustrated in FIG. 7C, both cables of power line 200 and sense line 300 are pulled out to the outside of battery case 100. Opening 450 of battery case 100 is formed so as to include the center of the side face to pull out power line 200 and sense line 300. Cable protection member 400 arranged at opening 450 is attachable to opening 450 in two or more directions. Through portion 410 is provided such that the position is changed according to the attaching direction of cable protection member 400 to opening 450. In the example embodiment, as illustrated in FIG. 5A, opening 450 is circular opening 450 provided on the position asymmetrical to the center of the side face to pull out power line 200, and cable protection member 400 arranged at opening 450 is also circular. It is assumed that through portion 410 is arranged at somewhere other than the center of a circle of cable protection member 400. As a result, the position of through portion 410 can be changed as the attaching direction of cable protection member 400 is changed in a rotating direction of opening 450. Note that opening 450 and cable protection member 400 do not need to be the circle, and may be a polygon or an indeterminate form as illustrated FIG. 5B and FIG. 5C. However, it is only necessary that an inner edge of opening 450 and an outer edge of cable protection member 400 can be attached to opening 450 in two or more directions without a gap. In addition, through portion 410 may be prepared by providing a hole on cable protection member 400 or just a cut may be made. It is preferable that cable protection member 400 is an elastic member deformable when inserting power line 200 and sense line 300.

Second Example Embodiment

Figure 3:
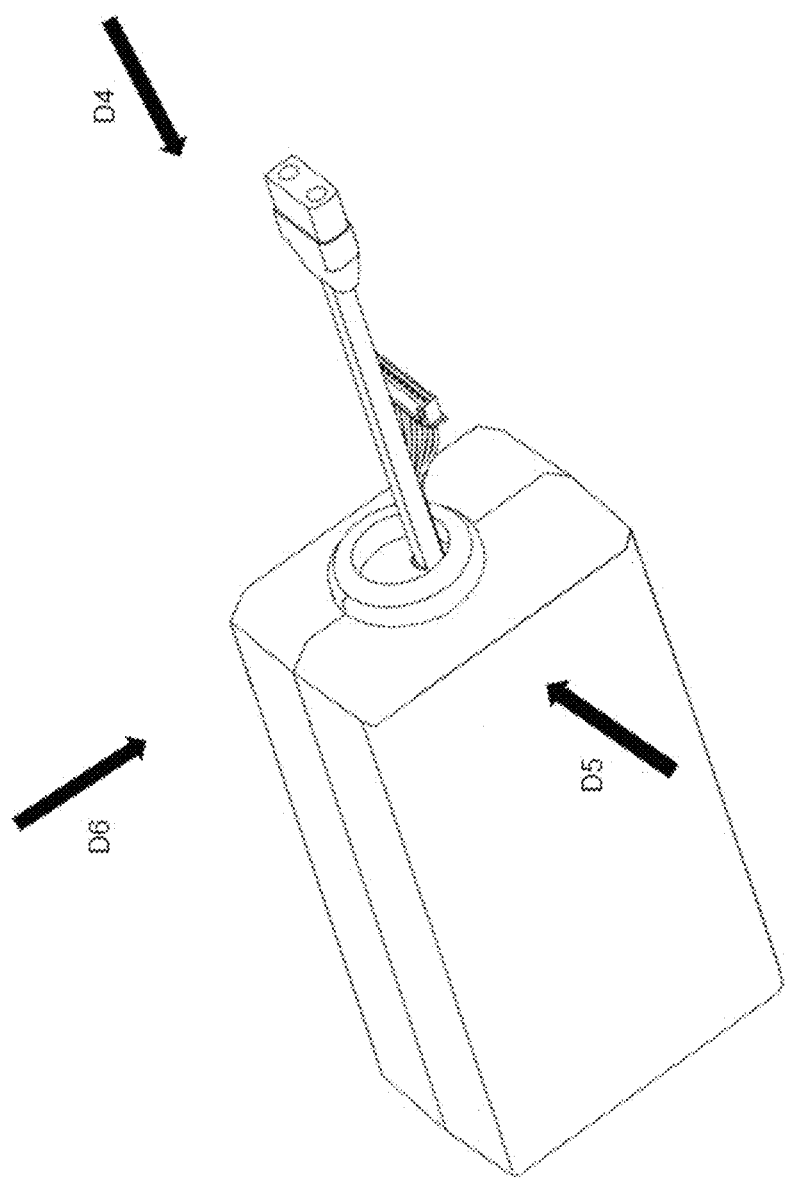
FIG. 3 is a perspective view illustrating an example of the battery pack of a second example embodiment.

FIG. 3 is a perspective view illustrating an example of the battery pack of the second example embodiment. A point particularly different from the first example embodiment illustrated in FIG. 1 is the point that, for a lamination number of unit batteries 1 used in assembled battery 170 (FIG. 11) housed inside the battery case, an odd number of unit batteries 1 are connected in series.

Assembled battery 170 illustrated in FIG. 11 illustrates an example of connecting seven pieces of unit batteries 1 in series. For battery case 100, the battery case identical to the battery case that houses six pieces of unit batteries 1 in series illustrated in FIG. 10 of the first example embodiment is used. To the part where electrode terminals 21 and 22 are connected in series, sense line 300 for measuring the voltage, the current or the like can be connected. In order to be connected with sense line 300, joint terminal 35 can be connected to a tip portion of electrode terminals 21 and 22, or the part where electrode terminals 21 and 22 are connected. Similarly, joint terminals 36 and 37 can be also connected to the part connected with power line 200. In assembled battery 170 in the example embodiment as well, battery protector 80 described from FIG. 6A to FIG. 6C can be arranged. For example, in laminated unit batteries 1, between the third layer and the fourth layer counting from unit battery 1 of an outermost layer on one side, battery protector 80 can be arranged.

For electrode terminals 21 and 22 of the example embodiment, the terminals are folded and welded such that the unit batteries adjacent in the lamination direction are connected with each other in series. When the even number of unit batteries 1 in the shape illustrated in FIG. 11 are connected in series in order in the lamination direction, the terminals of the different polarities positioned in the outermost layer are positioned diagonally in a view from the end face where the electrode terminals are taken out.

Figure 4:
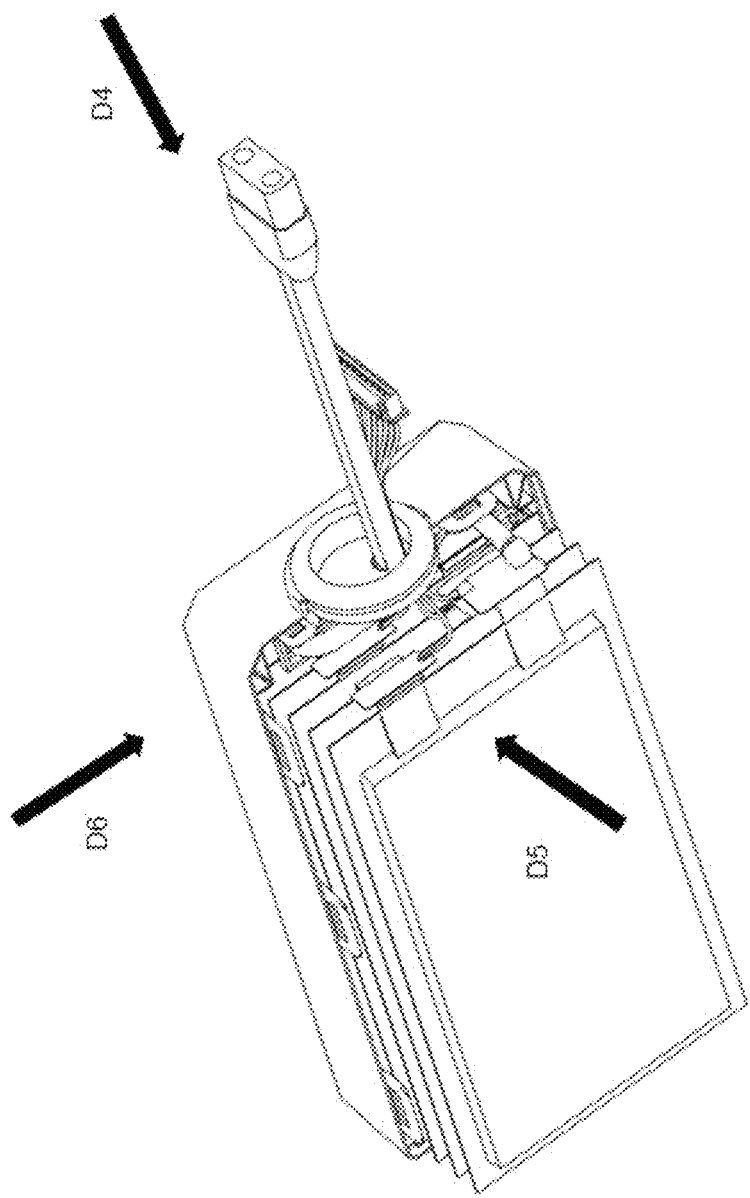
FIG. 4 is a perspective view schematically illustrating the inside of the battery case in an example of the battery pack illustrated in FIG. 3.
Figure 8C:
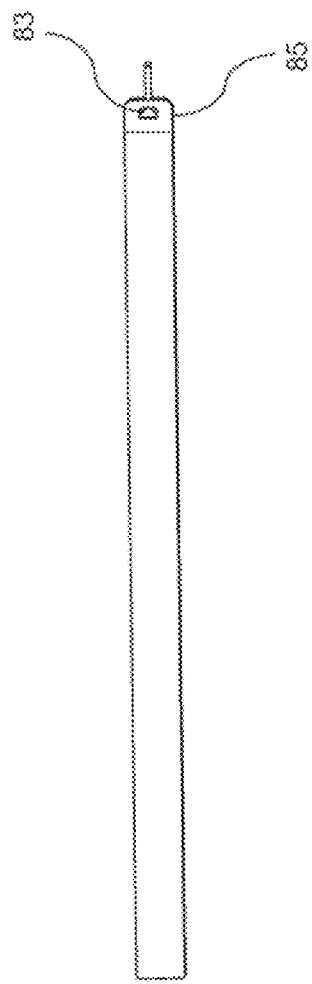
FIG. 8C is a schematically diagram viewing the arrangement of the cable, the battery protector and the cable protection member in the battery pack of the second example embodiment transparently from the side face vertical to the electrode lamination direction and also vertical to the end face where the cable protection member is arranged (viewing from the direction of an arrow D6 in FIG. 3 and FIG. 4).
Figure 8A:
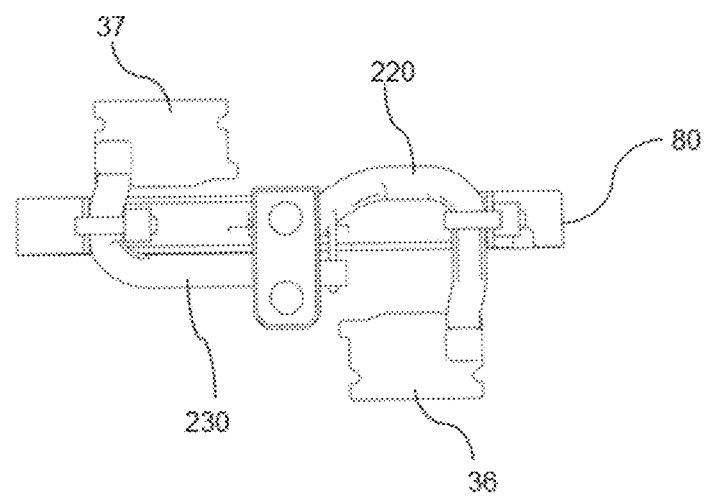
FIG. 8A is a schematically viewing the arrangement of the cable and the battery protector in the battery pack of the second example embodiment transparently from the end face where the cable protection member is arranged (viewing from the direction of an arrow D4 in FIG. 3 and FIG. 4).

FIG. 8A is a schematically viewing the arrangement of cables 220 and 230 and battery protector 80 in battery pack 1000 illustrated in FIG. 3 and FIG. 4 from the direction vertical to the end face where cable protection member 400 is arranged (the direction of an arrow D4 in FIG. 3 and FIG. 4). In FIG. 8A as well, in order to facilitate the understanding of the arrangement of power line 200, sense line 300 is omitted in the illustration. Joint terminals 36 and 37 connected to electrode terminals 21 and 22 of assembled battery 170 (FIG. 11) and cables 220 and 230 are welded respectively. One end side of power line 200 is attached toward the lamination direction of unit batteries 1. Cables 220 and 230 on the other end side of power line 200 are fixed to through hole 83 provided in locking portion 85 at a transverse end of battery protector 80 using fixing member 90. The other end side of cables 220 and 230 is bent at a large curvature toward the transverse center of battery protector 80 continuously from the part locked by locking portion 85. The other end side of cables 220 and 230 is fixed again to through hole 84 of locking portion 86 at the transverse center of the battery protector 80, and is pulled out from opening 450 provided on battery case 100.

Figure 8B:
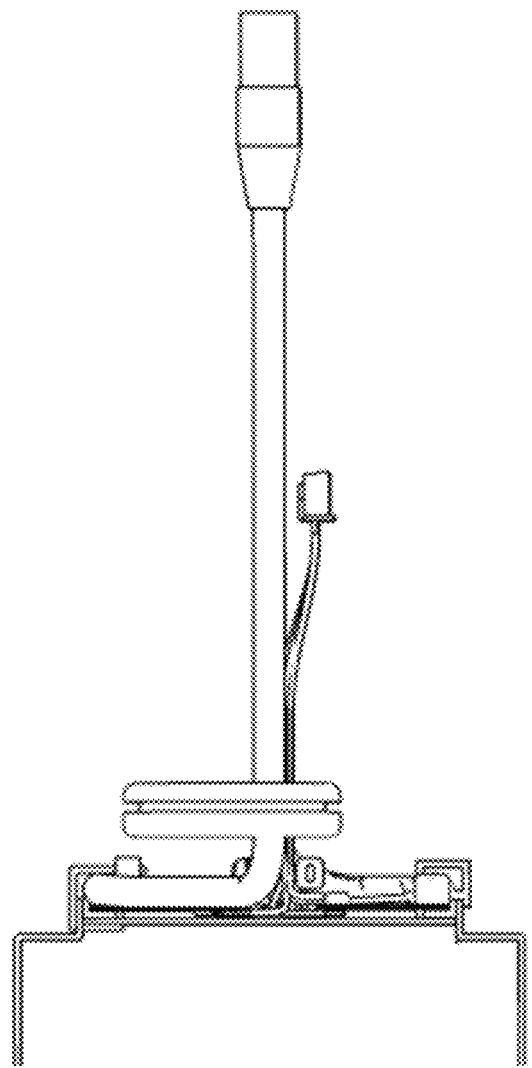
FIG. 8B is a schematically diagram viewing the arrangement of the cable, the battery protector and the cable protection member in the battery pack of the second example embodiment transparently from the electrode lamination direction (viewing from the direction of an arrow D5 in FIG. 3 and FIG. 4).
Figure 8C:
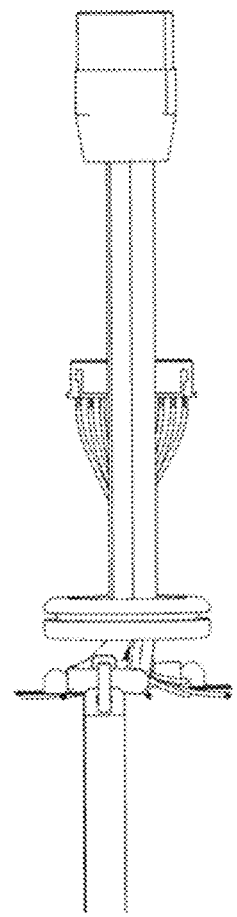
Figure 18:
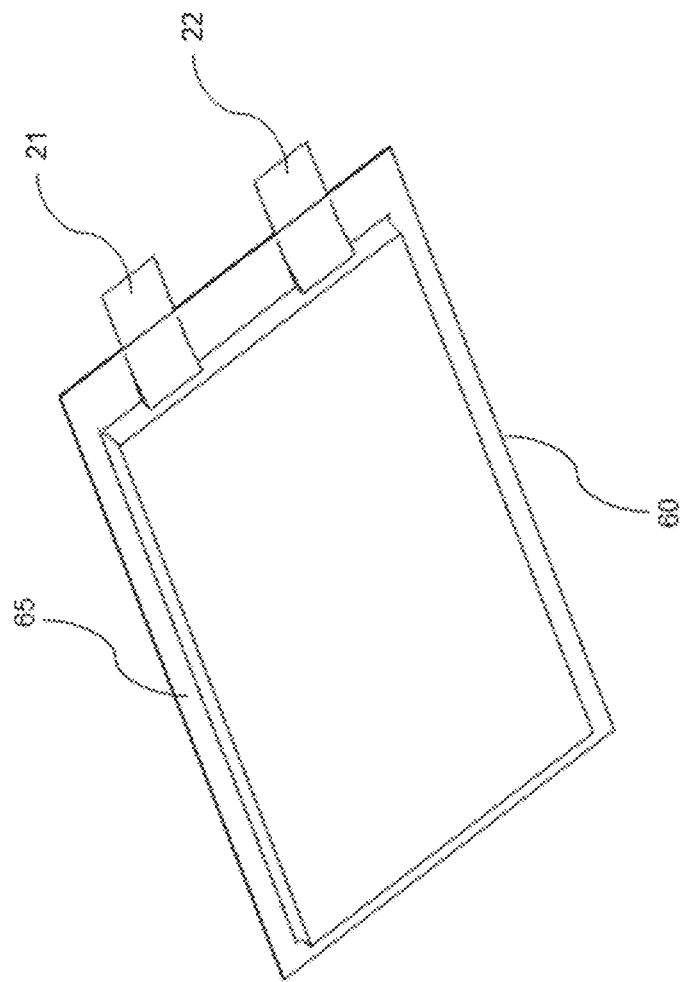
Figure 18:
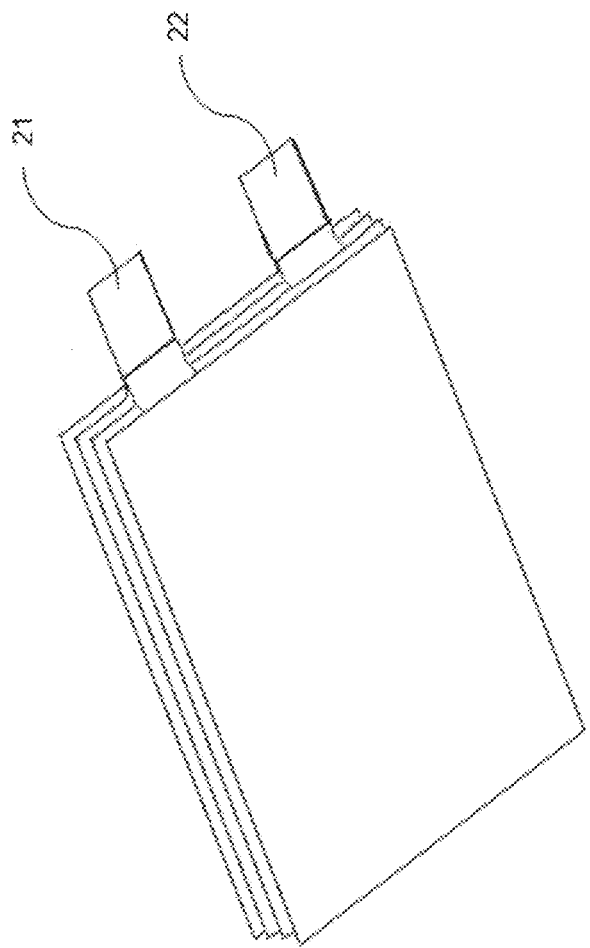
Figure 18:
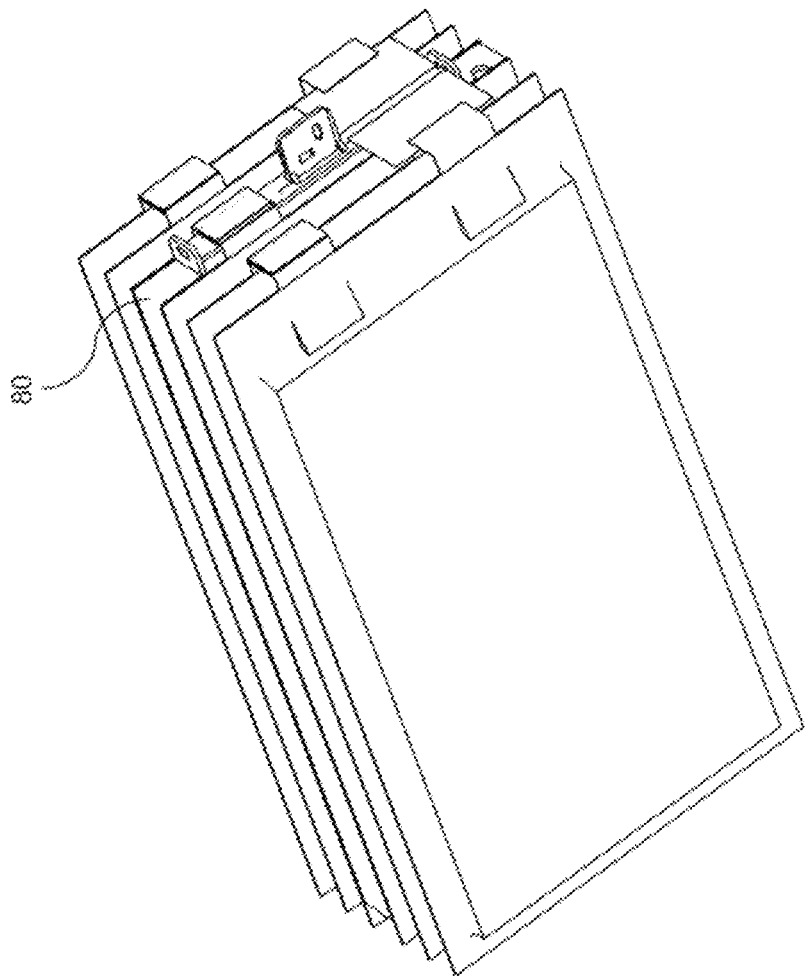

As illustrated in FIG. 8A and FIG. 8B, in the example embodiment, both cables of power line 200 and sense line 300 are pulled out from through portion 410 positioned at the center with respect to battery case 100. Then, as illustrated in FIG. 8C, both cables of power line 200 and sense line 300 are pulled out to the outside of battery case 100. Cable protection member 400 arranged at opening 450 of battery case 100 is attached such that through portion 410 is near the center.

In this way, even when the lamination number of the assembled battery housed inside the battery case is different, the assembled battery can be housed such that the cables are not disconnected or the like by a simple configuration using the common battery case.

In addition, the common battery case can be utilized regardless of the shape of the battery and the assembled battery and a connecting position of the electrode terminals and the cables. Thus, an effect of being able to house the batteries of various assembly numbers and dimensions is obtained.

Further, even when a circuit board including a protective circuit and a control circuit is provided between the battery and the assembled battery and the cables, the disconnection can be similarly prevented for the connection part of the circuit board and the cables as well. Thus, the effect of increasing a degree of freedom of the arrangement of the circuit board is obtained. In addition, by tightly sealing the through portion to take out the cables, the effect of easily providing a highly waterproof battery pack is also obtained.

According to the present invention, the degree of freedom for a size of the battery housed inside and cable wiring is high, and the force applied to the connection part of the cables and the terminals of the unit battery can be suppressed even when tension or the like is applied to the cables. Thus, the present invention can provide the battery pack that achieves safe and stable operations under an environment where a lot of vibrations are applied such as a vehicle, an aircraft and other in particular.

The present invention is described above with reference to the example embodiments, however, the present invention is not limited to the example embodiments above. To a configuration and details of the present invention, various modifications that can be understood by persons skilled in the art can be made within a scope of the present invention.

This application claims priority based on Japanese Patent Application No. 2017-121728 filed on Jun. 21, 2017, the entire disclosure of which is incorporated herein.

EXPLANATION OF REFERENCE NUMBERS 1 unit battery
100 battery case
101 first case body
102 second case body
105 abutting portion
160, 170 assembled battery
1000 battery pack
21, 22 electrode terminal
200 power line
220, 230 cable
250 connector 35, 36, 37 joint terminal
300 sense line (cable)
350 connector
400 cable protection member
410 through portion
450 opening
50 insulation sheet
60 outer container
65 flange portion
80 battery protector
81 frame portion
82 plate portion
83, 84 through hole
85, 86 locking portion
90 fixing member

What is claimed is:

1. A battery pack housing a battery inside a battery case, wherein said battery case includes:
   an opening;
   one or more cables electrically connected with said battery is inserted to the opening;
   a cable protection member including a through portion is arranged at the opening;
   said cable protection member is attachable to the opening in at least two different directions, and a position of the through portion to said battery case changes according to an attaching direction.

2. The battery pack according to claim 1, wherein the one or more cables are fixed at least one part at a position different from the through portion inside said battery case.

3. The battery pack according to claim 1,
   wherein said battery is an assembled battery in which a plurality of unit batteries are laminated;
   the assembled battery includes at least one battery protector between the laminated unit batteries;
   said battery protector includes a frame portion arranged at an outer peripheral edge portion of the unit battery, and
   the one or more cables are fixed using the frame portion and a fixing member or a locking portion provided on the frame portion and the fixing member.

4. The battery pack according to claim 1, wherein said battery case includes a locking portion on a battery case inner wall, and the one or more cables are fixed using the locking portion and a fixing member.

5. The battery pack according to claim 1, wherein the opening is formed, on a cable pull-out surface provided with the opening in said battery case, at a position asymmetrical to a longitudinal or to a transverse center of the pull-out surface.

6. The battery pack according to claim 1, wherein the through portion is arranged at a position not to be a center of said cable protection member.

7. The battery pack according to claim 1,
   wherein the through portion has an opening area equal to or smaller than a total cross-sectional area of the one or more cables inserted to the through portion; and
   the through portion and the one or more cables are closely attached without a gap.

8. The battery pack according to claim 1, wherein the through portion and the one or more cables inserted to the through portion are tightly sealed through a sealing member.

9. The battery pack according to claim 1, wherein an abutting portion is provided on an inner wall of said battery case, and the abutting portion is arranged on an inner side face of said battery case facing an electrode terminal of said battery, at a position which is at a shortest straight distance from said battery and which does not face said electrode terminal.

\* \* \* \* \*